United States Patent
Blanc et al.

(10) Patent No.: US 9,806,313 B2
(45) Date of Patent: Oct. 31, 2017

(54) ELECTROCHEMICAL CELLS WITH GLASS CONTAINING SEPARATORS

(71) Applicant: Leclanche SA, Yverdon-les-baines (CH)

(72) Inventors: Pierre Blanc, Morges (CH); Hilmi Buqa, Oberentfelden (DE)

(73) Assignee: Leclanche', Yverdon-les-baines (CH)

(*) Notice: Subject to any disclaimer, the term of this patent is extended or adjusted under 35 U.S.C. 154(b) by 0 days.

(21) Appl. No.: 14/297,648

(22) Filed: Jun. 6, 2014

(65) Prior Publication Data

US 2014/0363738 A1    Dec. 11, 2014

(30) Foreign Application Priority Data

Jun. 6, 2013    (GB) .................................... 1310059.9

(51) Int. Cl.
  *H01M 2/14*    (2006.01)
  *H01M 2/16*    (2006.01)
  *H01M 10/052*    (2010.01)

(52) U.S. Cl.
  CPC .......... *H01M 2/145* (2013.01); *H01M 2/166* (2013.01); *H01M 10/052* (2013.01); *H01M 2220/10* (2013.01); *H01M 2220/20* (2013.01)

(58) Field of Classification Search
  None
  See application file for complete search history.

(56) References Cited

U.S. PATENT DOCUMENTS

| | | |
|---|---|---|
| 8,216,722 B2 | 7/2012 | Gordon |
| 2005/0175894 A1 | 8/2005 | Visco |
| 2006/0057464 A1* | 3/2006 | Kim ................... B01D 67/0011 429/306 |
| 2006/0134526 A1* | 6/2006 | Han ..................... H01M 2/145 429/251 |
| 2008/0292968 A1 | 11/2008 | Lee et al. |
| 2009/0136830 A1 | 5/2009 | Gordon |
| 2010/0104948 A1 | 4/2010 | Skotheim |
| 2012/0235644 A1 | 9/2012 | Gordon |
| 2013/0149616 A1 | 6/2013 | Lee |

FOREIGN PATENT DOCUMENTS

| | | |
|---|---|---|
| WO | 2005076388 | 8/2005 |
| WO | 2007075867 | 7/2007 |

* cited by examiner

*Primary Examiner* — Barbara Gilliam
*Assistant Examiner* — Wyatt McConnell
(74) *Attorney, Agent, or Firm* — 24IP Law Group; Timothy R DeWitt

(57) ABSTRACT

A coated method for the preparation of a separator comprising multiple layers of glass or glass and ceramic particles for use in an electrochemical cell, an electrochemical cell comprising such a separator and the use of such an electrochemical cell. The method comprises the steps of providing a mixture of an organic polymeric material, glass or glass and ceramic particles and at least one solvent, and preparing a multilayer by phase inversion.

13 Claims, 1 Drawing Sheet

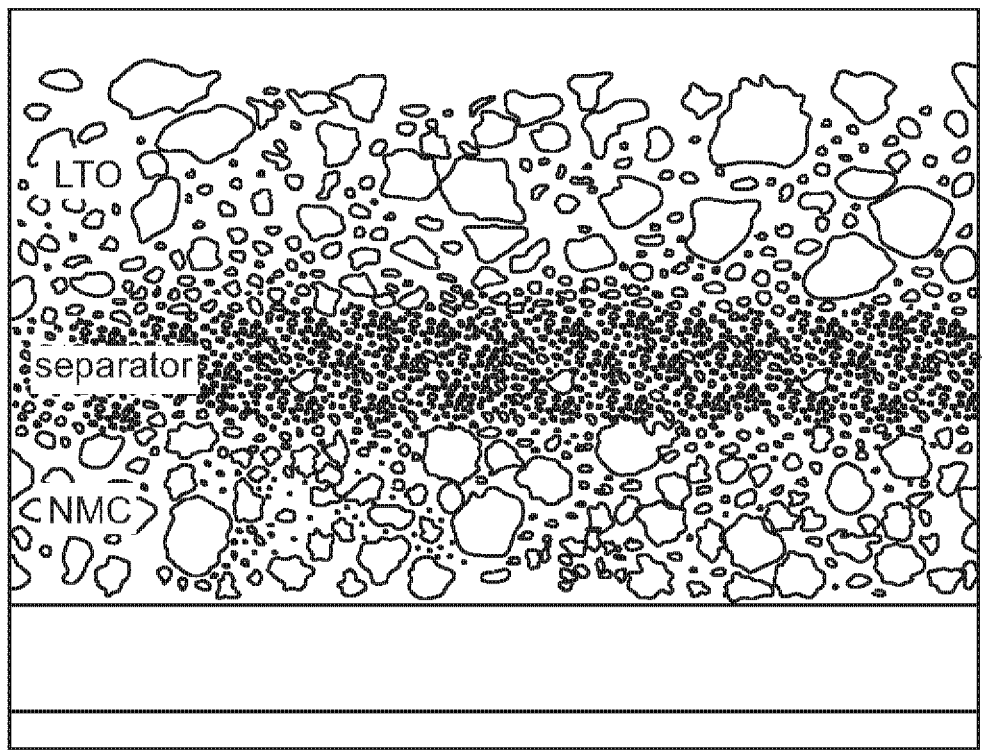

ELECTROCHEMICAL CELLS WITH GLASS CONTAINING SEPARATORS

BACKGROUND OF THE INVENTION

Field of the Invention

The invention relates to a coated method for the preparation of a separator comprising multiple layers of glass or glass and ceramic particles for use in an electrochemical cell, an electrochemical cell comprising such a separator and the use of such an electrochemical cell.

Brief Description of the Related Art

Beyond consumer electronics, Li-ion batteries are growing in popularity for stationary applications as storage of renewable energy, grid levelling, solar, large hybrid diesel engines, military, hybrid electric vehicles (HEV-s), and aerospace applications due to their high energy density.

A separator is a critical component within an electrochemical cell, especially for safety issues and life time. The separator absorbs the electrolyte so that it is filled with the electrolyte. It thereby allows the ionic conduction through the liquid electrolyte while keeping the positive and negative electrode separate. In order to improve the electrochemical cell's performance the used separator has to fulfil various requirements: mechanical stability, high thermal stability, zero shrinkage, porosity, in some instances ionic conductivity, etc. The quality of the separator will influence the characteristics of the separator electrochemical cell interface, internal resistance, and effectively influence the electrochemical cell's capacity, charge/discharge cycling capabilities, charge/discharge current density, and various electrical properties.

For large-scale (high energy and high power) electrochemical cells, safety issues are a critical challenge and for this reason the electrochemical cell manufacturers focus on improving manufacturing methods and increasing safety. Nowadays, the demand for high energy and high power electrochemical cells is rising rapidly. To generate such high current capacity and current density without disrupting the high-voltage capability, the separator must be mechanically stable and possess higher porosity than those in traditional batteries for consumer applications. Furthermore, the separator must be thermally stable at high temperatures in order to produce a stable, high-powered electrochemical cell.

Separators of the state of the art are usually single layer or multilayer polyolefin based separators. Alternatively, the separator may be produced with direct coating of ceramic particles with a binder polymer on the surface of the porous substrate.

Ceramic and/or glass particles may also be coated directly on the electrode surface, as for example disclosed in WO 2005/076388.

Commercially available polyolefin separators do not readily absorb the electrolyte solvents with high dielectric constants, such as ethylene carbonate (EC), and propylene carbonate (PC), because of their hydrophobic surfaces with low surface energy, and they have poor ability to retain the electrolyte solutions. In addition, the solvent leakage from the interfaces between the electrodes or the opposite sides of current collectors often causes the deterioration of the cycle life of electrochemical cells. Conventional separators of the state of the art usually shrink during heat generation.

U.S. Pat. No. 8,216,722 discloses a battery comprising a separator which in turn comprises a first, second and possibly third phase intermixed with one another, wherein the second phase comprises ionically conductive particles, such as ceramic particles, glass particles, glass-ceramic particles, and mixtures thereof. There is only one layer of the separator and the separator is substantially non-porous and solid-state.

SUMMARY OF THE INVENTION

The problem to be solved by the present invention is the provision of a method for the preparation of a separator comprising multiple layers of glass or glass and ceramic particles with controlled uniform porosity, improved wettability, electrochemical stability and safety for use in an electrochemical cell, and the provision of an electrochemical cell comprising such a separator.

In a preferred embodiment, the present invention is a coated method for the preparation of a porous separator comprising multiple layers wherein each layer comprises glass particles or both glass particles and ceramic particles. The method comprises the steps of providing a mixture of an organic polymeric material, glass particles or both glass particles and ceramic particles and at least two solvents, and preparing a multilayer by phase inversion. The separator may comprise, for example, multiple layers of glass particles or both glass particles and ceramic particles is deposited in a single step. The glass particles and/or ceramic particles may comprise 5-95% of the mixture. The organic polymeric material may comprise 5-95% of the mixture. The organic polymeric material may be selected from the group comprising poly(vinylidene fluoride)-hexafluoropropene (PVDF-HFP), polyvinylidene fluoride (PVDF), PTFE, polymethyl methacrylate (PMMA), polypropylene (PP), polyacrylic acid (PAA), polyvinylpyrrolidone (PVP), water based PVDF, acrylate, polyacrylate, styrene butadiene rubber (SBR), natural and synthetic rubbers, latex, OPPANOL®, polyethylene (PE), ethylene-vinyl acetate copolymer (EVA), polyvinyl alcohol (PVA), and mixtures thereof. The ceramic particles may be made of a material selected from the group comprising lithium aluminium titanium phosphate $Li_xAl_yTi_z(PO_4)_3$ where $1 \le x \le 2$, $0 \le y \le 1$ and $1 \le z \le 2$, nano-sized sized alumina ($Al_2O_3$), $ZrO_2$, SiC, $LiAlO_2$, $SnO_2$ or $BaTiO_3$. The glass particles and/or ceramic particles are ionic conductive and/or non-ionic conductive particles. The solvent may be selected, for example, from the group comprising: tetrahydrofuran (THF), acetone, ethanol, acetic acid, dimethyl acetamide (DMAC), dimethyl sulfoxide (DMSO), hexamethyl phosphoramide (HMPA), N-methylpyrrolidone (NMP), triethyl phosphate (TEP), trimethyl phosphate (TMP), tetramethyl urea (TMU), butanone, propylene carbonate (PC), butanol water, silanole, silandiole, ethylene glycol monohexyl ether, N,N-dimethyl ethanolamine, isopropyl alcohol, toluene, normal butyl alcohol, maleic anhydride, xylene, and mixtures thereof. An adhesion additive may be added to the mixture. The adhesion additive may be selected from the group comprising urethane and resins.

In another embodiment, the present invention is a large-scale electrochemical cell. The electrochemical cell may comprise electrolyte, an anode, a cathode and a separator, wherein the separator is prepared by the previously-described method. In yet another embodiment, the present invention is the use of an electrochemical cell with a separator prepared by the previously described method, wherein the anode material is selected from the group comprising graphite, or other carbon based materials, Si, or composites comprising Si, $Li_4Ti_5O_{12}$, $Li_2Ti_3O_7$, $Li_xTiO_2$ (where $0 \le x \le 1$), $TiO_2$, $TiO_2(OH)_x$ (where $x \ge 1$) and mixtures thereof. The electrochemical cell may be used in consumer electronics, stationary applications as storage of renewable energy, grid levelling, solar, large hybrid diesel engines, military, hybrid electric vehicles (HEV-s), and aerospace applications.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE FIGURES

For a more complete understanding of the present invention and the advantages thereof, reference is now made to the following description and the accompanying drawings, in which:

FIG. 1 is a cross-section of an electrochemical cell comprising an anode, a cathode and a separator comprising multiple layers of glass or glass and ceramic particles.

DETAILED DESCRIPTION OF THE PREFERRED EMBODIMENTS

A coated method is provided for the preparation of a separator comprising multiple layers of glass or glass and ceramic particles, wherein the method comprises the steps of providing a mixture of an organic polymeric material, glass or glass and ceramic particles and at least one solvent; and preparing a multilayer by phase inversion for use in an electrochemical cell.

The separator comprises multiple layers of glass or glass and ceramic particles may be deposited in a single step. That means that both steps of the method are performed together and no further steps are necessary.

The coated method by phase inversion allows the production of the separator under controlled conditions, which allows better processing control.

The method also allows a controlled uniform porosity of the separator comprising multiple layers of glass or glass and ceramic particles. The improved and controlled separator porosity leads to enhanced power capability. Thus, the performance of the electrochemical cell is enhanced. The improved separator porosity also leads to a better ion (e.g. Li-ion) diffusion through the separator. If the porosity is not appropriate, the Li-ions are limited in their diffusion, so the impedance will increase and the electrochemical performances (especially the C-rate) will decrease. It is important that the porosity is not too low and not too high. The porosity has to be high enough to hold a sufficient amount of electrolyte so that the ions can move easily between the electrodes. Uniform distribution of the pores is important for a uniform current distribution throughout the separator.

The increased impedance due to non-uniform distribution of the pores (leading to non-uniform current distribution throughout the separator) would also lead to more heat generation on the cell which in turn can lead to higher swelling. Thus, uniform distribution of the pores is advantageous for controlled swelling.

With the multilayer structure comprising glass particles or glass and ceramic particles, soft shorts in the electrochemical cell are avoided or delocalized on the single particles. Therefore, the multilayer structure leads to an enhanced electrochemical cell safety and protects the electrochemical cell form thermal runaway.

The wettability is also improved. The improved wettability means that the separator wets easily with the electrolyte and retains the electrolyte in the separator.

The separators comprising multiple layers of glass or glass and ceramic particles produced by the disclosed method show zero shrinkage during heat generation. The separators are also electrochemically stable against the electrolyte and electrode materials. This electrochemical stability is especially important under the oxidative and reductive conditions when the electrochemical cell is fully charged. The separators are also mechanically stable in the separator processing during the electrochemical cell assembly.

The separators comprising multiple layers of glass or glass and ceramic particles have a controlled structure due to the different boiling point (volatility) of the different solvents.

The glass and/or ceramic particles may comprise 5-95% of the mixture of organic polymeric material, glass or glass and ceramic particles and at least one solvent. The organic polymeric material may also comprise 5-95% of the mixture.

The organic polymeric material may be selected from the group comprising poly(vinylidene fluoride)-hexafluoropropene (PVDF-HFP), polyvinylidene fluoride (PVDF), PTFE, polymethyl methacrylate (PMMA), polypropylene (PP), polyacrylic acid (PAA), polyvinylpyrrolidone (PVP), water based PVDF, acrylate, polyacrylate, styrene butadiene rubber (SBR), natural and synthetic rubbers, latex, OPPANOL®, polyethylene (PE), ethylene-vinyl acetate copolymer (EVA), polyvinyl alcohol (PVA), and mixtures thereof.

The glass and ceramic particles can be different in size, morphology, texture, shape and surface area (BET), which enhances the ability to produce separators tailored for various applications in order to control the safety, flexibility, porosity, tortuosity and wettability of the separator. The glass and ceramic particles can be out of any glass or ceramic material. The ceramic particles may for example be made of a material selected from the group comprising lithium aluminium titanium phosphate $Li_xAl_yTi_z(PO_4)_3$ where $1 \leq x \leq 2$, $0 \leq y \leq 1$ and $1 \leq z \leq 2$, nano-sized alumina ($Al_2O_3$), $ZrO_2$, $SiC$, $LiAlO_2$, $SnO_2$ or $BaTiO_3$. The glass and/or ceramic particles are embedded in the organic polymeric material.

The glass and/or ceramic particles can be ionic conductive and/or non ionic conductive particles.

The at least one solvent may be selected from the group comprising tetrahydrofuran (THF), acetone, ethanol, acetic acid, dimethy lacetamide (DMAC), dimethyl sulfoxide (DMSO), hexamethyl phosphoramide (HMPA), N-methylpyrrolidone (NMP), triethyl phosphate (TEP), trimethyl phosphate (TMP), tetramethyl urea (TMU), butanone, propylene carbonate (PC), butanol water, silanole, silandiole, ethylene glycol monohexyl ether, N,N-dimethyl ethanolamine, isopropyl alcohol, toluene, normal butyl alcohol, maleic anhydride, xylene, and mixtures thereof. At least one solvent means that the phase inversion is performed with mixed solvents. Therefore, at least one solvent is necessary.

The coated method may also involve that an adhesion additive is added to the mixture. The adhesion additive may be selected from the group comprising urethane and resins.

The adhesion additives may enhance the adhesion between the organic polymeric material and the glass and/or ceramic particles.

The separator is intended for use in an electrochemical cell. An electrochemical cell (or battery) within the meaning of the present disclosure may be a primary cell or a secondary cell (i. e. an accumulator). The electrochemical cells may be stacked or wound. In one embodiment, the electrochemical cell may be a Li accumulator. The coated method according to the present disclosure also comprises that the separator is used in a large-scale electrochemical cell.

However, the separator of the present disclosure may be used with any type of electrochemical cell and a person skilled in the art may adapt the properties of the separator to different applications, i. e. to the size and material of the electrochemical cells used.

The separator produced by the method according to the present disclosure is cost saving because expensive organic solvents can be partly replaced by inorganic or less expensive organic solvents. In addition, the separator is cost saving because it at least partly comprises glass particles which are less expensive than other particles, i. e. ceramic particles.

An electrochemical cell is also provided which comprises an electrochemical cell electrolyte, an anode, a cathode and a separator, wherein the separator is prepared by the coated method disclosed above.

An electrochemical cell with a separator prepared by the disclosed method shows high safety with a high tolerance towards overcharge and over-discharge. The safety level is comparable with electrochemical cells comprising only ceramic particles. However, replacing some or all of the ceramic particles by glass particles makes the electrochemical cells lighter. As a consequence, the electrochemical cells have a higher gravimetric and volumetric energy density.

A use of an electrochemical cell as disclosed above is also provided. The anode material may be selected from the group comprising graphite, or other carbon based materials, Si, or composites comprising Si, $Li_4Ti_5O_{12}$, $Li_2Ti_3O_7$, $Li_x TiO_2$ (where $0 \leq x \leq 1$), $TiO_2$, $TiO_2(OH)_x$ (where $x \geq 1$) and mixtures thereof.

The invention is, however, not limited to the above materials and any electrode or electrolyte material known can be used with the present disclosure.

The electrochemical cell may be used in consumer electronics, stationary applications as storage of renewable energy, grid levelling, solar, large hybrid diesel engines, military, hybrid electric vehicles (HEV-s), and aerospace applications. It is to be understood that the present disclosure also comprises any other suitable application. The applications may depend on the size and the energy density of the electrochemical cell. Small- and large-scale (in terms of energy and power) electrochemical cells are comprised by the present disclosure. The small Li-ion format cells are used for consumer applications and as a single cell show a maximal capacity of about 1.5 Ah. The large format cells (ESS-, Automotive- and other Industrial Application) show a capacity above 4 Ah. The capacity is strongly dependent on the type (power or energy) of the Li-ion cells.

Consumer electronics within the meaning of the present disclosure comprises but is not limited to electronic equipment intended for everyday use, for example in entertainment, communications and office productivity. Electronic equipment comprises but is not limited to personal computers, telephones, MP3 players, audio equipment, televisions, calculators, GPS automotive electronics, digital cameras and players and recorders using video media such as DVDs, VCRs or camcorders.

The invention will now be described on the basis of the embodiments and the figures. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Examples

FIG. 1 shows a crossection of an electrochemical cell. The electrochemical cell comprises a lithium titanate (LTO) anode, a nickel, manganese and cobalt (NMC) cathode and a separator comprising multiple layers of glass and ceramic particles in between the anode and the cathode which was produced by the method according to the present disclosure. The ceramic particles are visible in the separator structure.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A coating method for the preparation of a porous separator comprising multiple layers, wherein each layer comprises both glass particles and ceramic particles, wherein the method comprises the steps of
providing a mixture of an organic polymeric material of both glass particles and ceramic particles and at least two solvents, wherein the glass particles and ceramic particles comprise 51-95% of the mixture, and
preparing a multilayer by phase inversion.

2. The method according to claim 1, wherein the separator comprising multiple layers of both glass particles and ceramic particles is deposited in a single step.

3. The method according to claim 1 or 2, wherein the organic polymeric material is selected from the group consisting of poly(vinylidene fluoride)-hexafluoropropene (PVDF-HFP), polyvinylidene fluoride (PVDF), PTFE, polymethyl methacrylate (PMMA), polypropylene (PP), polyacrylic acid (PAA), polyvinylpyrrolidone (PVP), water based PVDF, acrylate, polyacrylate, styrene butadiene rubber (SBR), natural and synthetic rubbers, latex, OPPANOL®, polyethylene (PE), ethylene-vinyl acetate copolymer (EVA), polyvinyl alcohol (PVA), and mixtures thereof.

4. The method according to any one of claim 1, 2, or 3, wherein the ceramic particles are made of a material selected from the group consisting of lithium aluminium titanium phosphate $Li_xAl_yTi_z(PO_4)_3$ where $1 \leq x \leq 2$, $0 \leq y \leq 1$ and $1 \leq z \leq 2$, nano-sized alumina ($Al_2O_3$), $ZrO_2$, SiC, $LiAlO_2$, $SnO_2$ or $BaTiO_3$.

5. The method according to any one of claim 1, 2, 3, or 4, wherein one of the at least two solvents is selected from the group consisting of tetrahydrofuran (THF), acetone, ethanol, acetic acid, dimethy lacetamide (DMAC), dimethyl sulfoxide (DMSO), hexamethyl phosphoramide (HMPA), N-methylpyrrolidone (NMP), triethyl phosphate (TEP), trimethyl phosphate (TMP), tetramethyl urea (TMU), butanone, propylene carbonate (PC), butanol water, silanole, silandiole, ethylene glycol monohexyl ether, N,N-dimethyl ethanolamine, isopropyl alcohol, toluene, normal butyl alcohol, maleic anhydride, xylene, and mixtures thereof.

6. The method according to any one of claim 1, 2, 3, 4, or 5, wherein an adhesion additive is added to the mixture.

7. The method according to claim 6, wherein the adhesion additive is selected from the group consisting of urethane and resins.

8. The method according to any of claim 1, 2, 3, 4, 5, 6, or 7 wherein the separator is placed into an electrochemical cell that is a large-scale electrochemical cell with a capacity of at least above 4 Ah.

9. An electrochemical cell comprising an electrochemical cell electrolyte, an anode, a cathode and a separator, wherein the separator is prepared by the method according to any of claims 1, 2, 3, 4, 5, 6, 7 or 8.

10. A method for forming a separator which comprises utilizing an electrochemical cell comprising an electrochemical cell electrolyte, an anode, a cathode and a separator, wherein the separator comprises multiple layers, wherein each layer comprises both glass particles and ceramic particles, wherein the method for forming the separator comprises the steps of
    providing a mixture of an organic polymeric material of both glass particles and ceramic particles and at least two solvents, wherein the glass particles and ceramic particles comprise 51-95% of the mixture, and
    preparing a multilayer by phase inversion, wherein the anode is made of an anode material selected from the group consisting of graphite, or other carbon based materials, Si, or composites consisting of Si, $Li_4Ti_5O_{12}$, $Li_2Ti_3O_7$, $Li_xTiO_2$ (where $0 \leq x \leq 1$), $TiO_2$, $TiO_2(OH)_x$ (where $x \geq 1$) and mixtures thereof.

11. A method for forming a separator which comprises utilizing an electrochemical cell comprising an electrochemical cell electrolyte, an anode, a cathode and a separator, wherein the separator comprises multiple layers, wherein each layer comprises both glass particles and ceramic particles, wherein the method for forming the separator comprises the steps of
    providing a mixture of an organic polymeric material of both glass particles and ceramic particles and at least two solvents, wherein the glass particles and ceramic particles comprise 51-95% of the mixture, and
    preparing a multilayer by phase inversion, wherein the electrochemical cell is provided for consumer electronics, stationary applications as storage of renewable energy, grid levelling, solar, large hybrid diesel engines, military, hybrid electric vehicles (HEV-s), and aerospace applications.

12. The method according to claim 1, wherein said step of preparing a multilayer by phase inversion comprises preparing with said mixture a mechanically stable separator having multiple layers of said glass particles and said ceramic particles and having uniform porosity.

13. The method according to claim 11, wherein said step of preparing a multilayer by phase inversion comprises preparing with said mixture a mechanically stable separator having multiple layers of said glass particles and said ceramic particles and having uniform porosity.

* * * * *